United States Patent
Gibney et al.

(10) Patent No.: US 8,413,251 B1
(45) Date of Patent: Apr. 2, 2013

(54) USING DISPOSABLE DATA MISUSE TO DETERMINE REPUTATION

(75) Inventors: Josephine Gibney, Los Angeles, CA (US); Shaun P. Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 781 days.

(21) Appl. No.: 12/242,634

(22) Filed: Sep. 30, 2008

(51) Int. Cl.
*G06F 21/00* (2006.01)

(52) U.S. Cl. .......................... 726/26; 709/224; 709/225

(58) Field of Classification Search .................. None
See application file for complete search history.

(56) References Cited

U.S. PATENT DOCUMENTS

| | | | |
|---|---|---|---|
| 7,197,539 | B1 | 3/2007 | Cooley |
| 7,412,516 | B1 | 8/2008 | Brown et al. |
| 7,472,420 | B1 | 12/2008 | Pavlyushchik |
| 7,546,349 | B1 * | 6/2009 | Cooley ..................... 709/206 |
| 7,562,304 | B2 | 7/2009 | Dixon et al. |
| 7,587,367 | B2 | 9/2009 | Mengerink |
| 7,668,951 | B2 | 2/2010 | Lund et al. |
| 7,783,741 | B2 * | 8/2010 | Hardt ........................ 709/224 |
| 7,870,608 | B2 * | 1/2011 | Shraim et al. ................. 726/22 |
| 8,001,606 | B1 | 8/2011 | Spertus |
| 8,019,689 | B1 | 9/2011 | Nachenberg |
| 8,200,587 | B2 | 6/2012 | Deyo |
| 2002/0046041 | A1 | 4/2002 | Lang |
| 2003/0167308 | A1 | 9/2003 | Schran |
| 2004/0054661 | A1 | 3/2004 | Cheung et al. |
| 2005/0050335 | A1 | 3/2005 | Liang et al. |
| 2005/0268090 | A1 | 12/2005 | Saw et al. |
| 2005/0283837 | A1 | 12/2005 | Olivier et al. |
| 2006/0026123 | A1 | 2/2006 | Moore et al. |
| 2006/0085328 | A1 * | 4/2006 | Cohen et al. ................. 705/39 |
| 2006/0212270 | A1 | 9/2006 | Shiu et al. |
| 2006/0212925 | A1 | 9/2006 | Shull et al. |
| 2006/0212930 | A1 | 9/2006 | Shull et al. |
| 2006/0212931 | A1 | 9/2006 | Shull et al. |
| 2006/0230039 | A1 | 10/2006 | Shull et al. |
| 2006/0253458 | A1 * | 11/2006 | Dixon et al. ................. 707/10 |
| 2006/0253581 | A1 * | 11/2006 | Dixon et al. ................. 709/225 |
| 2006/0253583 | A1 | 11/2006 | Dixon et al. |
| 2006/0253584 | A1 * | 11/2006 | Dixon et al. ................. 709/225 |
| 2007/0011739 | A1 | 1/2007 | Zamir et al. |

(Continued)

OTHER PUBLICATIONS

"McAfee SiteAdvisor: What is SiteAdvisor Software?" McAfee®, 2009, [Online] [Retrieved on Jul. 23, 2009] Retrieved from the Internet<URL:http://www.siteadvisor.com/howitworks/index.html>.

(Continued)

*Primary Examiner* — Nathan Flynn
*Assistant Examiner* — Michael R Vaughan
(74) *Attorney, Agent, or Firm* — Fenwick & West LLP

(57) ABSTRACT

A reputation system generates reputation scores for websites based at least in part on analyses of disposable data misuse associated with the websites. The reputation system receives reports describing disposable data misuses detected by clients and/or other entities, such as credit card issuers. The reputation system also detects certain types of misuse itself by analyzing received disposable data involved in a misuse detection to determine the websites or other entities that misused the data. The reputation system generates misuse statistics describing the amount of data misuse performed by websites. The reputation system generates reputation scores for websites based on the disposable data misuse statistics and, optionally, other reputation information for the websites, such as malware distribution associated with the websites. The reputation system reports the reputations of the websites to the clients.

20 Claims, 5 Drawing Sheets

U.S. PATENT DOCUMENTS

| | | | |
|---|---|---|---|
| 2007/0016953 | A1 | 1/2007 | Morris et al. |
| 2007/0050444 | A1 | 3/2007 | Costea et al. |
| 2007/0067843 | A1 | 3/2007 | Williamson et al. |
| 2007/0094734 | A1 | 4/2007 | Mangione-Smith et al. |
| 2007/0107053 | A1 | 5/2007 | Shraim et al. |
| 2007/0124579 | A1 | 5/2007 | Haller |
| 2007/0143629 | A1 | 6/2007 | Hardjono et al. |
| 2007/0156886 | A1 | 7/2007 | Srivastava |
| 2007/0162349 | A1* | 7/2007 | Silver .......................... 705/26 |
| 2007/0192855 | A1 | 8/2007 | Hulten et al. |
| 2007/0233782 | A1 | 10/2007 | Tali |
| 2008/0005223 | A1 | 1/2008 | Flake et al. |
| 2008/0028463 | A1 | 1/2008 | Dagon et al. |
| 2008/0082628 | A1 | 4/2008 | Rowstron et al. |
| 2008/0082662 | A1 | 4/2008 | Dandliker et al. |
| 2008/0104180 | A1 | 5/2008 | Gabe |
| 2008/0109244 | A1 | 5/2008 | Gupta |
| 2008/0109473 | A1* | 5/2008 | Dixon et al. ................ 707/102 |
| 2008/0109491 | A1 | 5/2008 | Gupta |
| 2008/0114709 | A1* | 5/2008 | Dixon et al. ................. 706/13 |
| 2008/0133540 | A1 | 6/2008 | Hubbard et al. |
| 2008/0133972 | A1 | 6/2008 | Verbowski et al. |
| 2008/0137864 | A1 | 6/2008 | Jin et al. |
| 2008/0140442 | A1* | 6/2008 | Warner ............................. 705/1 |
| 2008/0140820 | A1 | 6/2008 | Snyder et al. |
| 2008/0141366 | A1 | 6/2008 | Cross et al. |
| 2008/0189788 | A1 | 8/2008 | Bahl |
| 2008/0255977 | A1 | 10/2008 | Altberg et al. |
| 2008/0263677 | A1 | 10/2008 | Kaditz et al. |
| 2009/0125382 | A1 | 5/2009 | Delepet |
| 2009/0254993 | A1 | 10/2009 | Leone |
| 2009/0282476 | A1* | 11/2009 | Nachenberg et al. ........... 726/22 |
| 2009/0328209 | A1* | 12/2009 | Nachenberg ................... 726/22 |
| 2010/0153354 | A1 | 6/2010 | Buccella et al. |
| 2011/0040825 | A1 | 2/2011 | Ramzan et al. |
| 2011/0055923 | A1 | 3/2011 | Thomas |
| 2011/0067101 | A1 | 3/2011 | Seshadri et al. |

OTHER PUBLICATIONS

"StopBadware.org—StopBadware.org Frequently Asked Questions," stopbadware.org, 2009, [Online] [Retrieved on Jul. 23, 2009] Retrieved from the Internet<URL:htto://www.stopbadware.org/home/faq>.

"TrustedSource™: the Next-Generation Reputation System White Paper," Secure Computing Corporation, Oct. 2006, 6 pages.

Walsh, L., "Careful, Trend Micro Might Give You a Bad Web Reputation," ChannelWeb Network, Mar. 26, 2007, [online] [Retrieved on Jun. 21, 2007] Retrieved from the Internet<URL:http://www.v3.crn.com/security/198500632>.

Walsh, K., "Fighting PeertoPeer SPAM and Decoys with Object Reputation," ACM, Aug. 22-26, 2005, pp. 1-6.

International Search Report and Written Opinion, PCT Application No. PCT/US09/48328, Dec. 22, 2010, 8 pages.

Brin, S. et al., "The Anatomy of a Large-Scale Hypertextual Web Search Engine," Computer Networks and ISDN Systems, 1998, pp. 107-117, vol. 30, No. 1-7.

Christodorescu, M. et al., "Semantics-Aware Malware Detection," in Proceedings of the 205 IEEE Symposium on Security and Privacy, IEEE Computer Society, 2005.

Gonzalez, J. et al., "Residual Splash for Optimally Parallelizing Belief Propagation," AISTATS, 2009, 8 pages.

Gyongyi, Z. et al., "Combating Web Spam with Trustrank," Proceedings of the Thirtieth International Conference on Very Large Data Bases, VLDB Endowment, 2004, pp. 576-587, vol. 30.

Idika, N. et al., "A Survey of Malware Detection Techniques," Technical Report, Department of Computer Science, Purdue University, 2007, 48 pages.

Kephart, J. et al., "Automatic Extraction of Computer Virus Signatures," 4th Virus Bulletin International Conference, 1994, pp. 178-184.

Kleinberg, J., "Authoritative Sources in a Hyperlinked Environment," Journal of the ACM (JACM), 1999, pp. 604-632, vol. 46, No. 5.

Kolter, J. et al., "Learning to Detect and Classify Malicious Executables in the Wild," The Journal of Machine Learning Research, 2006, p. 2721-2744, vol. 7.

McGlohon, M. et al., "SNARE: A Link Analytic System for Graph Labeling and Risk Detection," Proceedings of the 15th ACM SIGKDD International Conference on Knowledge Discovery and Data mining, ACM, 2009, pp. 1265-1274, New York, N.Y.

Neville, J. et al., "Using Relational Knowledge Discovery to Prevent Securities Fraud," Proceedings of the Eleventh ACM SIGKDD International Conference on Knowledge Discovery in Data Mining, ACM, 2005, p. 458.

Neville, J. et al., "Collective Classification with Relational Dependency Networks," Workshop on Multi-Relational Data Mining (MRDM-2003), 2003.

Pandit, S. et al., "NetProbe: A Fast and Scalable System for Fraud Detection in Online Auction Networks," WWW '07, Proceedings of the 16th International Conference on World Wide Web, ACM, 2007, pp. 201-210, New York, N.Y.

Pei, J. et al., "On Mining Cross-Graph Quasi-Cliques," Proceedings of the Eleventh ACM SIGKDD International Conference on Knowledge Discovery in Data Mining, ACM, 2005, 11 pages.

Schultz, M. et al., "Data Mining Methods for Detection of New Malicious Executables," IEEE Symposium on Security and Privacy, IEEE Computer Society, 2001, pp. 38-49.

Siddiqui, M. et al., "A Survey of Data Mining Techniques for Malware Detection Using File Features," ACM-SE 46: Proceedings of the 46th Annual Southeast Regional Conference on XX, ACM, 2008, pp. 509-510, New York, N.Y.

Symantec Internet Security Threat Report, 36 pages, [Online] [Retrieved on Aug. 8, 2010] Retrieved from the Internet<URL:http://eval.symantec.com/mktginfo/enterprise/white_papers/b-whitepaper_exec_summary_internet_security_threat_report_xiii_04_2008.en-us.pdf>.

Symantec Malware Definition, [Online] [Retrieved on Aug. 6, 2010] Retrieved from the Internet<URL:http://www.symantec.com/norton/security_response/malware.jsp>.

Symantec Norton Community Watch Privacy Policy, [Online] [Retrieved on Aug. 6, 2010] Retrieved from the Internet<URL:http://www.symantec.com/about/profile/policies/ncwprivacy.jsp>.

Symantec Unveils New Model of Consumer Protection Codenamed "Quorum", 3 pages, [Online] [Retrieved on Aug. 8, 2010] Retrieved from the Internet<URL:https://www.symantec.com/about/news/release/article.jsp?prid=20090706_02>.

Tesauro, G. et al., "Neural Networks for Computer Virus Recognition," IEEE Expert, 1996, pp. 5-6, vol. 11, No. 4.

Tong, H. et al., "Fast Best-Effort Pattern Matching in Large Attributed Graphs," Proceedings of the 13th ACM SIGKDD International Conference on Knowledge Discovery and Data Mining, ACM, 2007, 10 pages.

Wang, W. et al., "GraphMiner: A Structural Pattern-Mining System for Large Disk-Based Graph Databases and Its Applications," Proceedings of the 2005 ACM SIGMOD International Conference on Management of Data, ACM, 2005, pp. 879-881.

Weaver, N. et al., "A Taxonomy of Computer Worms," Proceedings of the 2003 ACM Workshop on Rapid Malcode, ACM, 2003, pp. 11-18, New York, N.Y.

Yan, X. et al., "gSpan: Graph-Based Substructure Pattern Mining," Proceedings of the 2002 IEEE International Conference on Data Mining (ICDM '02), 2002, 4 pages.

Yan, X. et al., "Mining Closed Relational Graphs with Connectivity Constraints," Proceedings of the Eleventh ACM SIGKDD International Conference on Knowledge Discovery in Data Mining, ACM, 2005, p. 333.

Yedidia, J. et al., "Understanding Belief Propagation and Its Generalizations," Exploring Artificial Intelligence in the New Millennium, 2003, pp. 236-239, vol. 8.

Zeng, Z. et al., "Coherent Closed Quasi-Clique Discovery from Large Dense Graph Databases," Proceedings of the 12th ACM SIGKDD International Conference on Knowledge Discovery and Data Mining, ACM, 2006, 6 pages.

Zhu, X., "Semi-Supervised Learning with Graphs," 2005, 174 pages.

* cited by examiner

USING DISPOSABLE DATA MISUSE TO DETERMINE REPUTATION

BACKGROUND

1. Field of the Invention

This invention pertains in general to determining reputations of websites and other entities, and in particular to determining reputations based on consumer exposure statistics.

2. Description of the Related Art

Consumers interacting with websites on the Internet face a variety of risks when they provide private information. For example, a consumer that provides an email address to a website runs the risk that the website will send unsolicited email to that address. A consumer that provides a credit card to a website similarly runs the risk that the website will abuse the credit card by, e.g., making bogus charges.

Consumers are often willing to provide private information to large, well-known websites because such sites have good reputations. Thus, the consumers can feel confident that the sites will not abuse their private information. However, there are many lesser known websites on the Internet that consumers sometimes patronize, often without having a good sense of whether the sites can be trusted to not misuse private information.

Reputation systems can be used to gather and provide information about various aspects of websites from customers, such as whether the sites can be trusted with private information. Generally, a website that has misused consumers' private information in the past will receive a bad reputation from consumers, thereby notifying other consumers of the risks associated with the site.

However, existing reputation systems have problems, such as not being able to differentiate among websites with high levels of granularity. For example, conventional website reputation systems can help consumers sort out good versus bad websites, but these systems are unable to provide valuable information to the consumers in distinguishing different levels of "good". Thus, a "good" merchant might still sell customer lists, or have employees that do not follow proper security procedures, potentially exposing consumers to credit card theft or spam.

As alluded to above, existing reputation systems focus on gauging various aspects of a website's reputation by allowing consumers to leave feedback regarding a visited website, and rating the website based on the feedback. A problem with these systems is that they rate websites based on subjective feedback. For example, a consumer may wrongly accuse a website of being a source of spam or post a bad review because his or her order arrived a day or two late. Further, many consumers may not bother to provide feedback at all.

Thus, existing reputation systems do not provide enough granularity in reputation ratings, and can be unduly influenced by subjective evaluations.

BRIEF SUMMARY

The problems described above are addressed by a method, system, and computer-readable storage medium. Embodiments of the method and system determine a reputation for a website. Embodiments of the method comprise detecting misuse of disposable data provided to the website and generating disposable data misuse statistics for the website responsive to the disposable data misuse detection. Based at least in part on the disposable data misuse statistics, the method generates and stores a reputation score for the website. Embodiments of the system comprise a computer processor for executing computer program modules and a computer-readable storage medium storing executable computer program modules. The computer program modules comprise a misuse detection module configured to detect misuse of disposable data provided to the website and a data analysis module configured to generate disposable data misuse statistics for the website responsive to the disposable data misuse detection. The modules further comprise a reputation generation module configured to generate and store a reputation score for the website based at least in part on the disposable data misuse statistics.

Embodiments of the computer-readable storage medium report a reputation of a website. The embodiments comprise a monitoring module configured to monitor interactions between a client and the website to detect an attempted submission of non-disposable data from the client to the website and to submit disposable data in place of the non-disposable data and a detection module configured to detect misuse of the disposable data submitted to the website. The embodiments further comprise a reporting module configured to provide a report describing the reputation of the website, the reputation based at least in part on the detected misuse of the disposable data.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
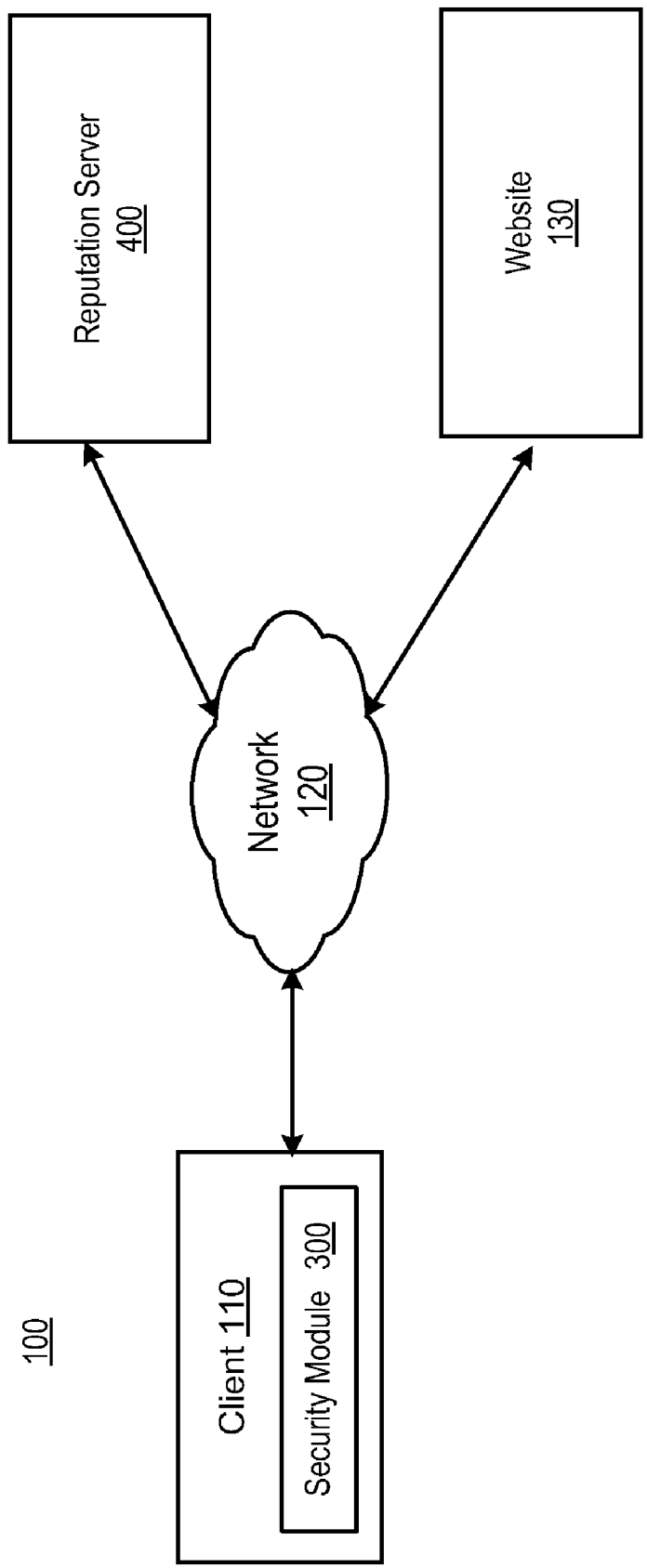
FIG. 1 is a high-level diagram illustrating an environment having a reputation system according to one embodiment.

FIG. 1 is a high-level diagram illustrating an environment 100 having a reputation system that evaluates and provides reputations for websites 130 according to one embodiment. The illustrated environment 100 comprises a client 110, a reputation server 400, and a website 130. The client 110, the reputation server 400 and website 130 are interconnected via a computer network 120. Only one of each entity is shown in FIG. 1 in order to simplify and clarify the figure. Embodiments of the environment 100 can include many clients 110 and websites 130, and also multiple reputation servers.

The illustrated environment 100 represents a typical computing environment where multiple consumers interact with multiple websites 130. In this environment, a consumer uses the client 110 to access online services provided by a website 130. The reputation server 400 receives information regarding consumer interactions with the website 130 and generates a reputation score for the website 130. The reputation score can be based on a variety of factors, including whether the website 130 misuses data, such as email addresses and credit card numbers, provide to the website 130.

Turning now to the individual entities illustrated in FIG. 1, the client 110 is used by a consumer to interact with the website 130. For example, a consumer uses the client 110 to submit an email address and/or a credit card number to a form on a web page provided by the website 130 to obtain a service provided by the website 130. In one embodiment, the client 110 is a personal computer (PC) such as a desktop or notebook computer. In other embodiments, the client 110 is a mobile telephone, personal digital assistant, or other electronic device. In some embodiments, the client 110 includes a local storage, such as a hard drive or flash memory device, in which the client stores data used by the consumer in performing tasks.

In one embodiment, the client 110 executes a security module 300. As the consumer interacts with websites 130, the security module 300 monitors the interactions and detects when the consumer attempts to submit certain personally identifiable information (also referred to herein as "non-disposable data") to the websites 130. Upon detecting the attempted submission of personally identifiable information, the security module 300 optionally replaces the information with disposable data. The security module 300 can also detect misuse of disposable data and can report such misuse to the reputation server 400. In addition, the security module 300 receives reputation scores of websites 130 from the reputation server 400 and provides the scores to the consumer.

For purposes of this description, personally identifiable information is information that can potentially be used by a recipient to uniquely identify a consumer. "Disposable data" are data that can be substituted for personally identifiable information during interactions with websites 130 and other entities and cannot be used to identify a consumer. For example, a website 130 can use a disposable email address to contact a consumer, but the website 130 cannot determine the real identity of the consumer based on the disposable email address. Thus, a consumer can use disposable data in the interactions without risking exposure of personally identifiable information to abuse or misuse by the recipient websites 130. Two common types of personally identifiable information for which disposable data are substituted are email addresses and credit card numbers. Other types of personally identifiable information for which disposable data are substituted include phone numbers, physical addresses, electronic check numbers, bank routing numbers and/or account numbers.

A disposable email address is an address that is valid for only a certain entity (e.g. website 130). In one embodiment, the disposable email address resembles a conventional email address such as "user@sample.net" where "user" is the name of the consumer and the portion after the "@" sign specifies the address of a mail server. The disposable email address uses a name value that uniquely and opaquely identifies the consumer, and references a special mail server that is configured to receive email directed to the disposable address, identify a corresponding non-disposable email address for the consumer, and forward the mail to that non-disposable address. In addition, the email address can encode additional information, such as the identity of the website 130 for which it is valid.

Similarly, a disposable credit card is a credit card that is valid for only a certain entity and/or transaction. The credit card number is issued by a bank or other credit card issuer for a specific transaction conducted by a specific consumer at a specific website 130. Oftentimes the disposable credit card has a credit limit equal to, or slightly above, the amount of the transaction for which it is used.

The reputation server 400 generates reputation scores for websites 130 based on analysis of disposable data misuse and/or other factors. The reputation server 400 can receive reports describing disposable data misuse detected at clients 110 and/or other entities such as credit card issuers. In addition, the reputation server 400 can detect certain types of misuse itself. The reputation server 400 analyzes the misuses and generates reputation scores for websites 130 in response thereto. The reputation server 400 makes the reputation scores available to the consumers by, e.g., sending the scores to security modules 300 at the clients 110 and providing a website on which the scores are displayed.

The network 120 enables communications among the clients 110, the reputation server 400, and the websites 130. In one embodiment, the network 120 is the Internet and uses standard communications technologies and/or protocols. Thus, the network 120 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Figure 2:
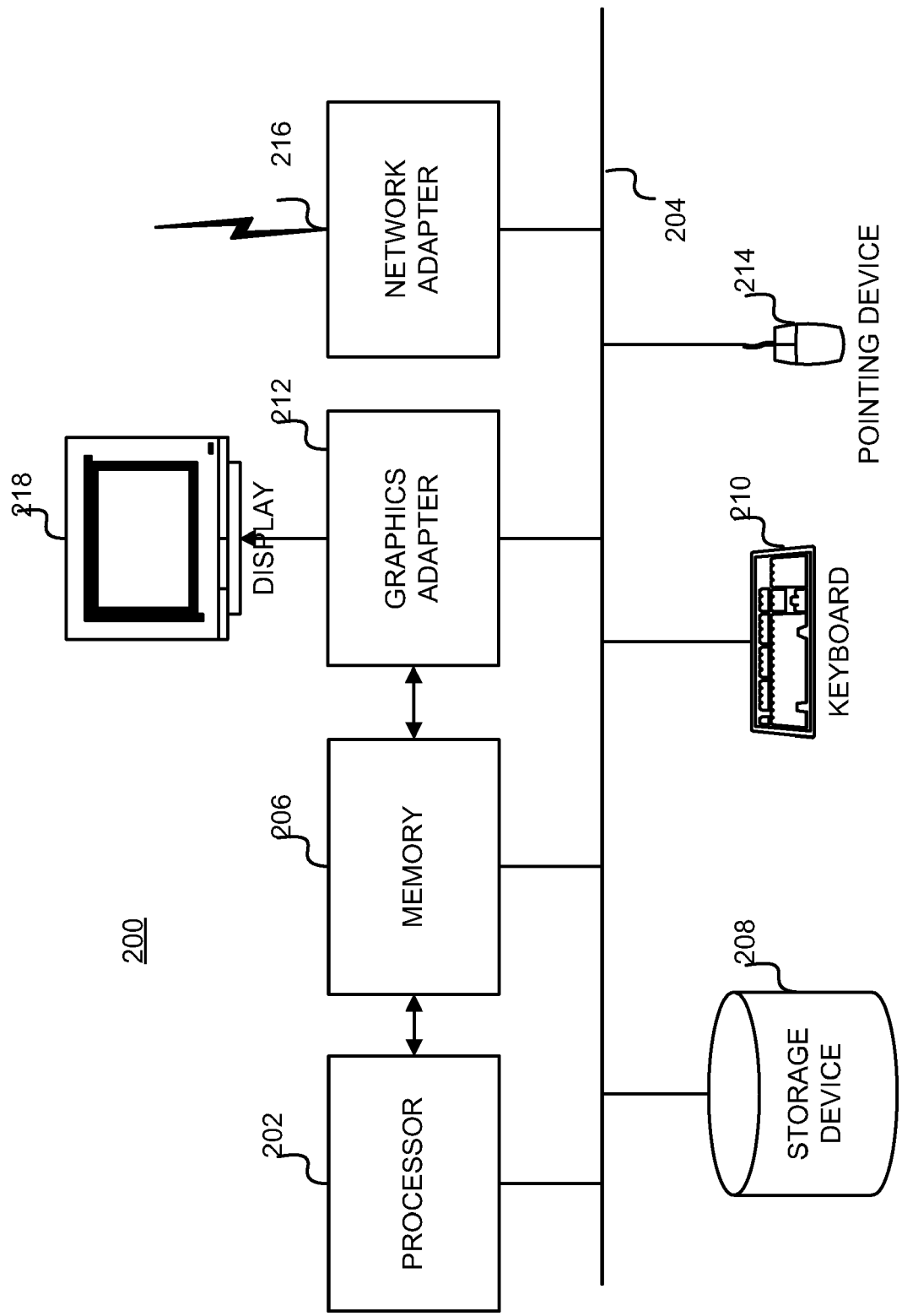
FIG. 2 is a high-level block diagram of a computer for acting as a client, a reputation server, a web server, and/or an email server according to one embodiment.

FIG. 2 is a high-level block diagram of a computer 200 for acting as a client 110, a reputation server 400, and/or a web server hosting the website 130 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. In one embodiment, the functionality of the bus 204 is provided by an interconnecting chipset. A display 218 is coupled to the graphics adapter 212.

The storage device 208 includes a computer-readable storage medium capable of storing data, like a hard drive, compact disk read-only memory (CD-ROM), DVD, or a solid-state memory device. In one embodiment, the storage device 208 serves as the local storage 111 illustrated in FIG. 1. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 120.

As is known in the art, a computer 200 can have different and/or other components than those shown in FIG. 2. In addition, the computer 200 can lack certain illustrated components. For example, a computer 200 acting as a server 116 can lack a keyboard 210, pointing device 214, graphics adapter 212, and/or display 218.

Also as is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

Figure 3:
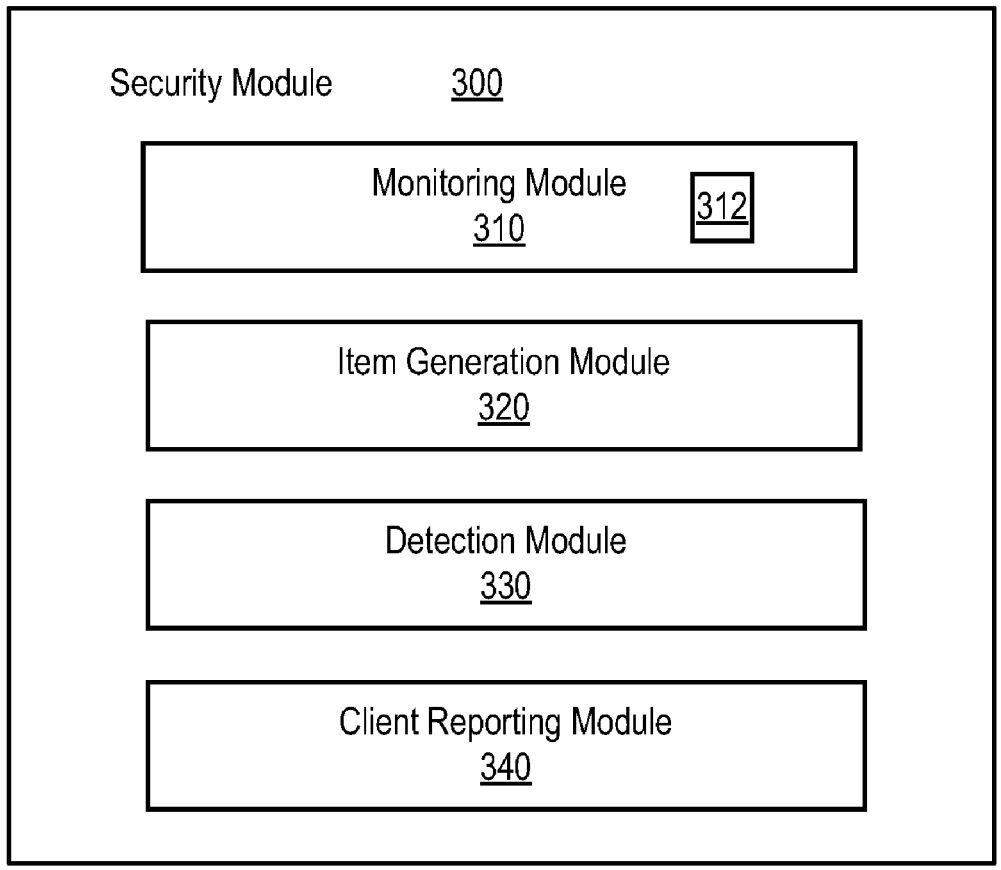
FIG. 3 is a high-level block diagram illustrating modules within the security module of a client according to one embodiment.

FIG. 3 is a high-level block diagram illustrating modules within the security module 300 of a client 110 according to one embodiment. The security module 300 includes a monitoring module 310, an item generation module 320, a detection module 330 and a client reporting module 340. In general, the security module 300 monitors consumer interactions with websites 130, provides disposable data for certain interactions, detects misuse of disposable data by websites 130, and reports the detected misuse to the reputation server 400. In addition, the secure module 300 also reports the reputations of websites 130 to the consumer. Other embodiments can have different and/or additional modules than the ones shown in the figure. In addition, the functions can be distributed among the modules in a different manner than is described here.

A monitoring module 310 monitors interactions (e.g., communications) between a consumer using the client 110 and websites 130. As a consumer interacts with a website 130, the monitoring module 310 watches for the consumer to submit non-disposable data, such as a credit card number or email address. Upon detecting an attempted submission of non-disposable data, the monitoring module 310 determines whether the consumer has previously used disposable data corresponding to the detected non-disposable data and website 130. In one embodiment, the monitoring module 310 determines whether the consumer has previously used disposable data by querying a disposable data storage module 312. The disposable data storage module 312 maintains a correlated list of non-disposable data, disposable data, and the recipients of the disposable data. If disposable data corresponding to the detected non-disposable data were previously provided to the website 130, the monitoring module 310 obtains the corresponding disposable data. If corresponding disposable data do not exist, the monitoring module 310 informs the consumer that the consumer's non-disposable data are about to be communicated to the website 130 and seeks instruction from the consumer as to whether to provide disposable data in place of consumer's non-disposable data. If the consumer elects to use disposable data, the monitoring module 310 communicates with an item generation module 320 to generate the disposable data. The monitoring module 310 inserts the retrieved or generated disposable data into the communication in place of the non-disposable data.

The item generation module 320 receives a request from the monitoring module 310 to generate disposable data for detected non-disposable data and generates or otherwise obtains the requested disposable data. The request from the monitoring module 310 includes information about the non-disposable data and information about the communication in which the data are to be used. This latter information can include, for example, the intended recipient of the disposable data, and the value of a transaction in which the data are to be used. The item generation module 320 uses the information to generate the disposable data and provides the disposable data to the monitoring module 310.

Depending upon the embodiment, the item generation module 320 can generate the disposable data locally at the client 110 and/or via interactions with the reputation server 400 or other remote entities. For example, the item generation module 320 can generate a disposable email address locally, and provide the disposable email address to the monitoring module 310 for use in the communication and to a mail server provided by the reputation server 400 for use in forwarding messages having the disposable email address. The item generation module 320 can also provide information about the communication in which the data are to be used to a server operated by a credit card issuer and receive the disposable credit card number in response.

Turning now to the detection module 330 illustrated in FIG. 3, the detection module 330 detects consumer disposable data misuse associated with a website 130, and sends the details of the disposable data misuse to the reputation server 400 for further analysis. In one embodiment, the detection module 330 detects disposable data misuses by observing consumer interactions with the client 110. For example, the detection module 330 observes consumer interaction with an email program executing on the client 110 or remotely to determine whether the consumer marks an email sent to the disposable email address as spam. With respect to disposable credit cards, the detection module 330 observes if the consumer uses the client 110 to dispute a charge to a disposable credit card.

Upon detecting disposable data misuse through the consumer's actions with the client 110, the detection module 330 determines the website 130 with which the misused disposable data are associated. In one embodiment, the detection module 330 checks the local disposable data storage module 312 that maintains a correlated list of disposable data and the websites for which the disposable data were generated. In another embodiment, the detection module 330 communicates with the reputation server 400 for the association information.

The detection module 330 sends a report describing the detected disposable data misuse to the reputation server 400. The detection module 330 may also store the disposable data misuse report locally. The disposable data misuse report may include the disposable data that were misused, the website or other entity for which the disposable data were originally generated, the nature of the misuse and the number of disposable data misuses that have accumulated for that disposable data and/or website 130. In another embodiment, while the disposable data misuse report is sent to the reputation server 400, the reputation server 400 determines the association between the misused disposable data and the website 130 based on the misuse report and/or other factors.

A client reporting module 340 generates reports describing websites 130 reputations to the consumer. In one embodiment, the client reporting module 340 receives a reputation score of a website 130 from the reputation server 400 and provides the score to the consumer. For example, the reporting module 340 can detect that the consumer has browsed to a specific website 130, and provide the consumer with a report describing the reputation score of the website 130. Depending upon the embodiment and/or configuration settings, the reputation reports can take a plurality of forms, such as color-coded icon displayed in a toolbar associated with a web browser. The tool bar can display an icon with a color corresponding to the reputation score of the website 130: green for a website with a good reputation, yellow for a website to be used with caution and red for a website with a bad reputation.

The client reporting module 340 can also provide the reputation of a website 130 via a dialog box or similar technique. For example, the client reporting module 340 can be configured to provide the reputation score to the consumer as part of a prompt that is displayed by the monitoring module 310 when the consumer attempts to send non-disposable information to a website 130. The monitoring module 310 can be further configured to require the consumer to submit disposable data to a website if the site's reputation score is below a threshold. Other embodiments use other techniques for reporting website reputations to the consumer.

Figure 4:
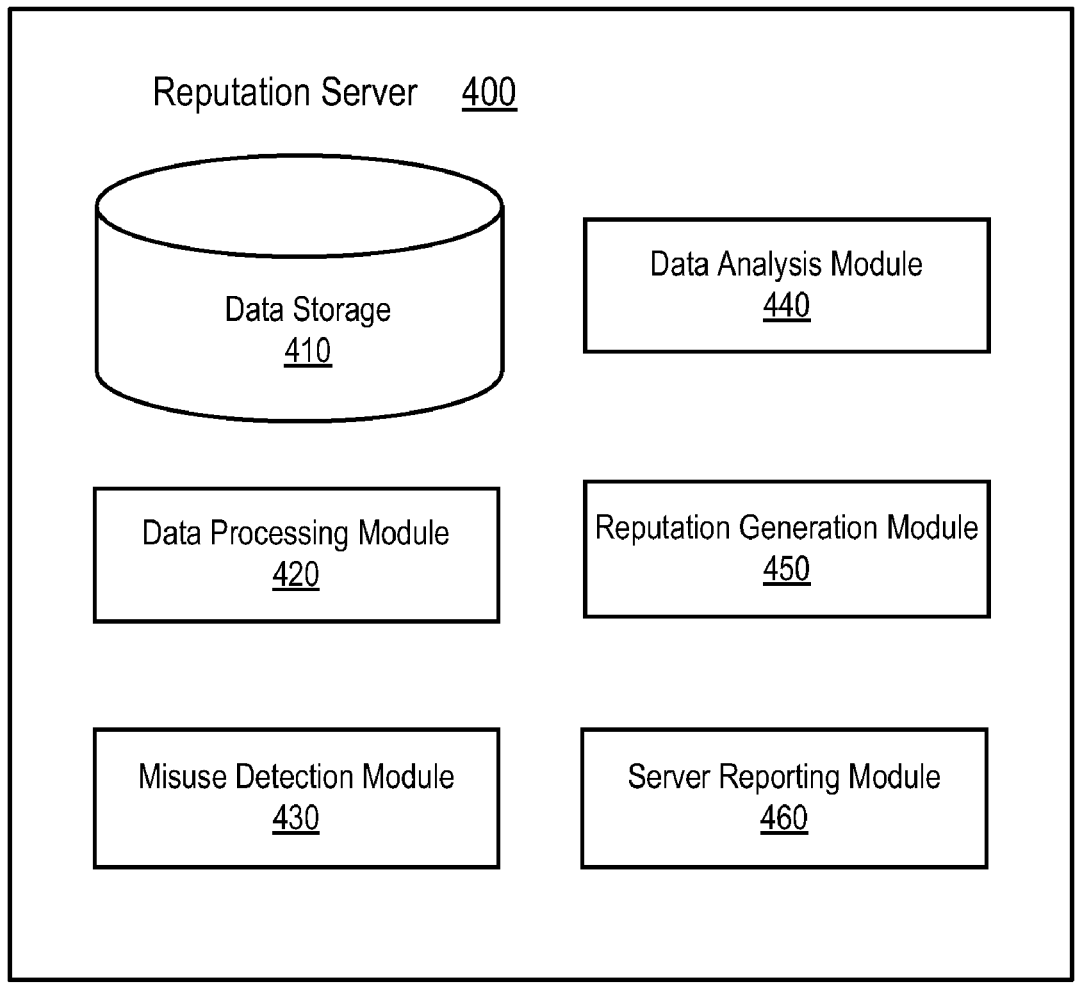
FIG. 4 is a high-level block diagram illustrating modules within the reputation server according to one embodiment.

FIG. 4 is a high-level block diagram illustrating modules within the reputation server 400 according to one embodiment. The reputation server 400 includes a data storage 410, a data processing module 420, a misuse detection module 430, a data analysis module 440, a reputation generation module 450, and a server reporting module 460. Other embodiments can have different and/or additional modules than the ones shown in the figure. In addition, the functions can be distributed among the modules in a different manner than is described here.

The data storage 410 stores information used during the operation of the reputation server 400. This information can include both disposable data and non-disposable data associated with one or more consumers and websites 130 being evaluated by the reputation server 400. The information stored by the data storage 410 also includes disposable data misuse information describing aspects of disposable data misuse conducted by the websites 130, as well as reputation scores for websites 130 and related data. Depending upon the embodiment and/or configuration settings, the data storage 410 can store the information using relational database records, XML files, flat text files, etc.

The data processing module 420 analyzes received data to determine appropriate processing actions to perform. In one embodiment, the data processing module 420 includes an email server that processes emails sent to disposable email addresses. Upon receiving an email sent to a disposable email address, the data processing module 420 uses information in the data storage 410 to determine the non-disposable email address associated with the disposable address and forwards the email to the non-disposable address. In some situations, such as when the reputation server 400 detects that the email is associated with misuse, the data processing module 420 can quarantine the email, scan it for malicious software, or perform other actions instead of forwarding it to the non-disposable address.

A misuse detection module 430 detects disposable data misuse. The misuse detection can occur in response to reports from clients 110 and reports from other entities such as credit card issuers. For example, a misuse report received from a client 110 can indicate that a particular email sent to a disposable email address was spam and therefore constituted misuse. Similarly, a misuse report received from a credit card issuer can indicate that a disposable credit card was used in a transaction for which it was not intended, or that a consumer disputed a transaction involving the disposable credit card.

The misuse detection module 430 can also detect misuse based on data received by the data processing module 420. The misuse detection module 430 can determine that an email sent to a disposable email address was sent by an entity other than the one to whom the disposable email address was provided. For example, the misuse detection module 430 can determine that an email sent to a specific disposable address was sent from a sub domain different than that of the website to which the address was provided. Additionally, the misuse detection module 430 can determine that an email received by the data processing module 420 contains spam or malicious software and, therefore, constitutes misuse even if received from the same website to which the disposable address was provided.

The misuse detection module 430 analyzes disposable data involved in a misuse detection to determine the website or other entity that misused the data. For example, the misuse detection module 430 analyzes disposable data misuse reports received from clients 110 to reveal the identities of entities that misused the disposable data. Similarly, the misuse detection module 430 examines the credit card issuer reports regarding misuse of disposable credit cards to identify the entities that misused the cards. Likewise, the misuse detection module 430 analyzes emails constituting misuse received by the data processing module 420 to determine the entities to which the email addresses were originally provided (i.e., the entity that misused the email address).

A data analysis module 440 calculates misuse statistics based on the misuse detections detected by the misuse detection module 430 and other information stored in the data storage 410. The misuse statistics generally describe the amount of misuse performed by an entity relative to the overall amount of disposable data provided to the entity. The misuse statistics can track overall misuse across all types of disposable data and can also be segregated by different types of data. Thus, for a single website 130 the website statistics indicate the amount of disposable email addresses misused by that website relative to the total number of disposable email addresses provided to the website. In one embodiment, the data analysis module 420 determines a misuse count counting the number of misuses associated with a website 130. The analysis module 440 uses the misuse count to calculate a misuse percentage associated with the website 130 that describes the proportion of the misuse count relative to all disposable data of the same type provided to the website 130.

A reputation generation module 450 generates reputation scores for websites 130 based on the analyses performed by the data analysis module 440 and/or other information. The reputation score indicates the propensity of the website 130 to misuse disposable data and, by association, non-disposable data, provided to it. In one embodiment, the reputation generation module 450 generates the reputation score of a website 130 based on the misuse percentage associated with the website 130. The higher the misuse percentage, the lower the reputation score of the website 130. The reputation generation module 450 can also use other criteria in addition to, or instead of, the misuse statistics to generate the reputation scores. For example, the reputation score for a website can be based on a variety of criteria including the misuse statistics for that website, whether the website is known to distribute malware, and reputations of consumers that are known to frequently visit the website. Further, the reputation generation module 450 can generate multiple reputation scores for a website 130, with each score describing a reputation of the website 130 with respect to a different aspect, such as separate scores for email misuse, credit card misuse, and malware distribution. The reputation scores for websites 130 are stored in the data storage 410.

A server reporting module 460 reports the reputation scores to the clients 110. In one embodiment, the server reporting module 460 receives a request for a reputation score for a particular website 130 from a security module 300 and provides the score in response. In another embodiment, the server reporting module 460 provides a website that a consumer can access in order to view reputation scores of various websites.

Figure 5:
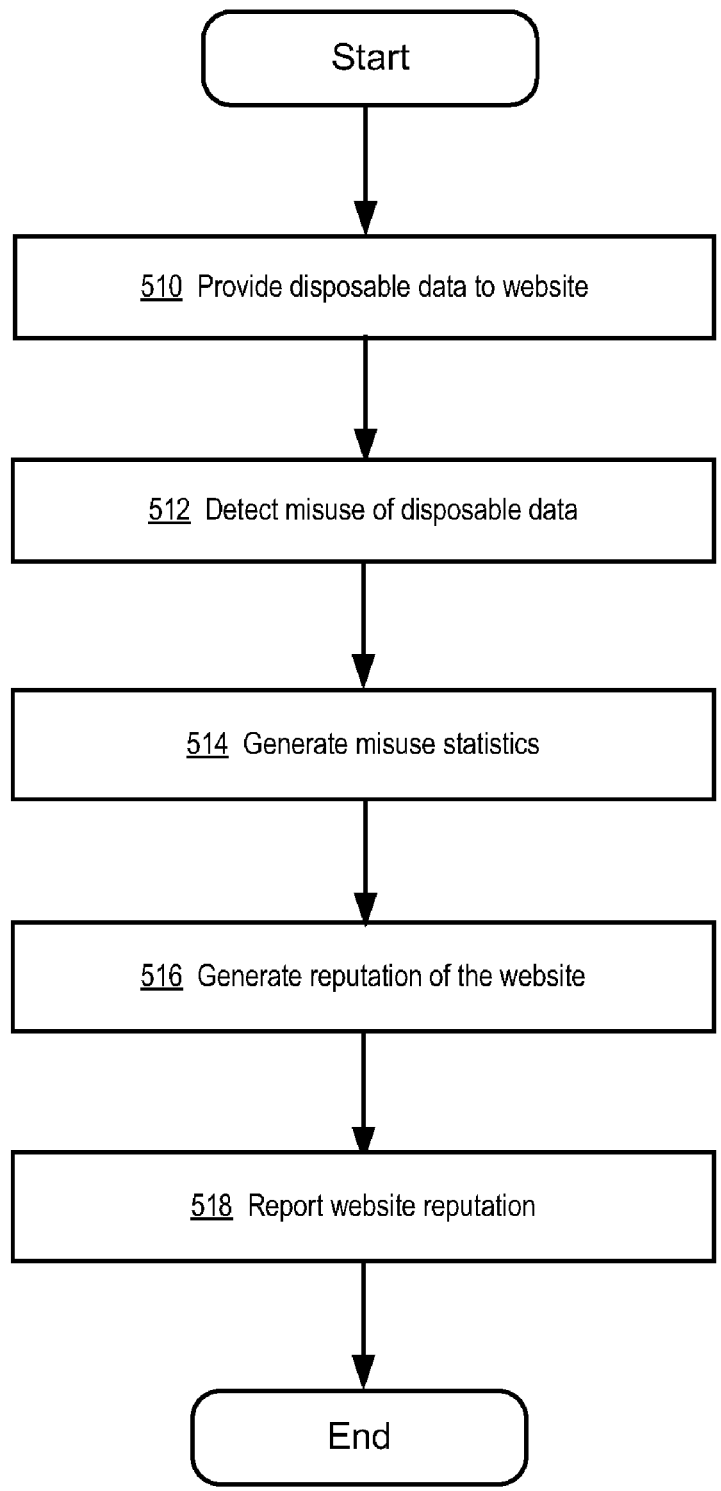
FIG. 5 is a flowchart showing a method of using the reputation system according to one embodiment.

FIG. 5 is a flowchart showing a method of using the reputation system according to one embodiment. Other embodiments perform different and/or additional steps than the ones described here. Moreover, other embodiments perform the steps in different orders.

Initially, disposable data are generated and provided 510 to a website 130. Depending upon the embodiment, the disposable data are generated by the security module 300 at the client, by the reputation server 400, or by a different entity.

The disposable data are provided 510 to the website 130 typically as part of an interaction between the client 110 and the website 130.

The reputation server 400 detects 512 misuse of disposable data. The misuse can be detected based on reports received from clients 110, reports from other entities such as credit card issuers, and/or based on determinations made by the reputation server 400 itself. The reputation server 400 generates 514 misuse statistics describing the amount of data misuse performed by the website 130. For example, the misuse statistics can describe the percentage of disposable data provided to the website that were misused. The reputation server 400 generates 516 a reputation score for the website 130 based on the disposable data misuse statistics and/or other reputation information for the website 130. The reputation server reports 518 the reputation of the website to the client 110.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of determining a reputation for a website, comprising:
 using a computer to perform steps comprising:
  detecting an attempted submission of non-disposable data to the website by a consumer;
  determining whether the non-disposable data corresponds to disposable data previously provided to the website for the consumer;
  responsive to the non-disposable data corresponding to the disposable data previously provided to the website for the consumer, substituting the disposable data for the non-disposable data in a submission to the website;
  detecting misuse of the disposable data submitted to the website;
  generating disposable data misuse statistics for the website responsive to the disposable data misuse detection; and
  generating and storing a reputation score for the website based at least in part on the disposable data misuse statistics.

2. The method of claim 1, wherein the disposable data comprise non-personally identifiable information substituted for personally identifiable information during an interaction with the website.

3. The method of claim 1, wherein the disposable data provided to the website comprise one or more types of disposable data from the group consisting of:
 a disposable credit card;
 a disposable email address;
 a phone number;
 a physical address;
 a bank routing number;
 a bank account number; and
 an electronic check number.

4. The method of claim 1, wherein detecting misuse of disposable data provided to the website comprises:
 receiving a report from an entity via a network, the report indicating that a misuse of disposable data was detected by the entity.

5. The method of claim 1, wherein generating the disposable data misuse statistics comprises:
 determining a proportion of disposable data misuse by the website relative to all disposable data provided to the website.

6. The method of claim 1, wherein the reputation score indicates a propensity of the website to misuse disposable data provided to it.

7. The method of claim 1, further comprising reporting the reputation score of the website to a client via a network.

8. A system for determining a reputation for a website, comprising:
 a computer processor for executing computer program modules; and
 a non-transitory computer-readable storage medium storing executable computer program modules comprising:
  a monitoring module configured to:
   detect an attempted submission of non-disposable data to the website by a consumer;
   determine whether the non-disposable data corresponds to disposable data previously provided to the website for the consumer; and
   responsive to the non-disposable data corresponding to the disposable data previously provided to the website for the consumer, substitute the disposable data for the non-disposable data in a submission to the website;
  a misuse detection module configured to detect misuse of the disposable data submitted to the website;
  a data analysis module configured to generate disposable data misuse statistics for the website responsive to the disposable data misuse detection; and
  a reputation generation module configured to generate and store a reputation score for the website based at least in part on the disposable data misuse statistics.

9. The system of claim 8, wherein the disposable data comprise non-personally identifiable information substituted for personally identifiable information during an interaction with the website.

10. The system of claim 8, wherein the disposable data provided to the website comprise one or more types of disposable data from the group consisting of:
 a disposable credit card;
 a disposable email address;
 a phone number;
 a physical address;
 a bank routing number;
 a bank account number; and
 an electronic check number.

11. The system of claim 8, wherein the misuse detection module is further configured to:
 receive a report from an entity via a network, the report indicating that a misuse of disposable data was detected by the entity.

12. The system of claim 8, wherein the data analysis module is further configured to:
 determine a proportion of disposable data misuse by the website relative to all disposable data provided to the website.

13. The system of claim 8, wherein the reputation score indicates a propensity of the website to misuse disposable data provided to it.

14. The system of claim 8, further comprising a reporting module configured to report the reputation score of the website to a client via a network.

15. A non-transitory computer-readable storage medium storing executable program modules for reporting a reputation of a website, the modules comprising:

a monitoring module configured to monitor interactions between a client and the website to detect an attempted submission of non-disposable data from the client to the website by a consumer, to determine whether the non-disposable data corresponds to disposable data previously provided to the website for the consumer and, responsive to the non-disposable data corresponding to the disposable data previously provided to the website for the consumer, to submit the correlated disposable data in place of the non-disposable data;

a detection module configured to detect misuse of the disposable data submitted to the website; and a reporting module configured to provide a report describing the reputation of the website, the reputation based at least in part on the detected misuse of the disposable data.

16. The computer-readable storage medium of claim 15, wherein the disposable data comprise one or more types of data from the group consisting of:
a disposable credit card;
a disposable email address;
a phone number;
a physical address;
a bank routing number;
a bank account number; and
an electronic check number.

17. The computer-readable storage medium of claim 15, further comprising:
an item generation module configured to generate the disposable data responsive at least in part to the detected attempted submission of non-disposable data to the website, the non-disposable data comprising personally identifiable information and the disposable data comprising non-personally identifiable information associated with the website.

18. The computer-readable storage medium of claim 15, wherein the detection module is further configured to detect misuse of the disposable data submitted to the website by observing consumer interactions with the client.

19. The computer-readable storage medium of claim 15, wherein the detection module is further configured to generate a report describing the detected disposable data misuse and provide the report to a reputation server, wherein the reputation server uses the report describing the detected disposable data misuse to determine the reputation of the website.

20. The computer-readable storage medium of claim 15, wherein the reporting module is further configured to:
receive the report describing the reputation of the website from a reputation server via a network; and
provide the received report to a consumer using the client.

* * * * *